United States Patent [19]
Kurz, Jr.

[11] 3,874,773
[45] Apr. 1, 1975

[54] MIRROR CASE WITH EXPANSION-ABSORBING MEANS

[75] Inventor: Arthur W. Kurz, Jr., Birmingham, Mich.

[73] Assignee: Donnelly Mirrors, Inc., Holland, Mich.

[22] Filed: Sept. 24, 1973

[21] Appl. No.: 399,961

[52] U.S. Cl. ............................. 350/288, 350/310
[51] Int. Cl. ..................................... G02b 5/08
[58] Field of Search ................. 350/288–310, 350/257; 248/488

[56] References Cited
UNITED STATES PATENTS

| | | | |
|---|---|---|---|
| 3,427,095 | 2/1969 | Dykema | 350/288 |
| 3,448,553 | 6/1969 | Herr et al. | 350/288 |
| 3,591,258 | 7/1971 | Lipsett | 350/257 |

*Primary Examiner*—Ronald L. Wibert
*Assistant Examiner*—Michael J. Tokar
*Attorney, Agent, or Firm*—Price, Heneveld, Huizenga & Cooper

[57] ABSTRACT

A rearview mirror assembly for vehicles having a case formed from thermoplastic material and including peripheral sides outlining a mirror element received therein and a wall spaced from the edge of said mirror providing expansion from between said mirror edge and case in extreme temperatures. The wall includes flexible, resilient fins extending into contact with the mirror edge at spaced intervals to absorb dimensional changes in the assembly and to prevent vibration of the mirror in the case. Flexible fins are also provided on support ribs extending between the case back and mirror back surface to bias the mirror against a heat-staked retaining edge.

19 Claims, 6 Drawing Figures

3,874,773

MIRROR CASE WITH EXPANSION-ABSORBING MEANS

This invention relates to mirror assemblies for vehicles and, more particularly, to rearview mirror assemblies preferably used within the interior of the vehicles.

BACKGROUND OF THE INVENTION

The adequate and efficient support of mirror elements within vehicles has long been a problem. Previously, it has been commonplace to secure a mirror element comprising a suitably shaped piece of glass having a reflective layer thereon rigidly within a metallic or otherwise stiff case to form a mirror assembly. The metallic case was generally folded over the edges of the mirror element thereby tightly holding the mirror in place. Not only was this undesirable because the weight of the assembly was generally very large due to the metallic case, but the problems of retention of the mirror element in extreme temperatures and image-blurring vibration were also very toublesome.

With respect to vibration, the rigid metallic cases were difficult to manufacture such that the peripheral sides thereof conformed exactly to the edges of the mirror element held therewithin. Consequently, the mirror element had room to shift about thereby causing bothersome, vision-reducing vibration of the mirror element when the vehicle in which the mirror was mounted was driven over rough roads. The extreme weight of the mirror assembly, which was normally mounted in a cantilevered fashion from a suitable support, added to this effect because of the resulting large movement of force about the support point.

The prior known cases also were undesirable in extremely hot or cold weather. In hot weather, the difference in coefficience of expansion of the glass and materials from which the case was made caused the case to expand at a greater rate sometimes allowing the mirror element to pop out of the case entirely. On the other hand, in extremely cold temperatures, the faster rate of contraction of the case about the mirror element many times caused the glass element to be fractured or broken. Therefore, the associated problems of weight, vibration and mirror element retention caused previously known rigid-type mirror cases to be less than desirable.

SUMMARY OF THE INVENTION

Accordingly, it is the purpose of the present invention to provide a mirror assembly for vehicles wherein the completed assembly is extremely lightweight and yet overcomes the problems of vibration and mirror retention in extreme temperatures by providing an expansion-absorbing means adjacent and between the peripheral edge of the mirror and the peripheral sides of the case.

In the preferred embodiment, the mirror assembly comprises a shell-like mirror case formed from a thermoplastic material such as polyvinylchloride and including a front opening, peripheral sides outlining the shape of a mirror element received in the front opening, and a back spaced a distance from the mirror element when received therein. In accordance with the concept of the present invention, a peripheral space is provided about the entire periphery of the mirror element as defined by a wall extending parallel to the mirror edge and spaced a distance therefrom. Extending between the wall and the mirror edge are a plurality of flexible, resilient expansion-absorbing fins at spaced intervals along the length of the wall. These fins extend into contact with the mirror edge and retain it firmly within the case thereby preventing any shift, rattling or vibration of the mirror element within the case. However, in extremes of temperatures, for example, when the case contracts at a faster rate than does the mirror element itself, the fins bend or "give" as the space between the mirror edge and the case reduces thereby continuously holding the mirror element firmly within the case and yet absorbing the change in dimension therein.

The mirror element is held within the case by a retaining lip or edge which is heated and formed against a preferably beveled edge extending between the front mirror surface and the peripheral side of the mirror. The mirror is supported by a peripheral ledge as well as a plurality of upstanding ribs extending between the spaced back of the case and the rear surface of the mirror element. These ribs also include flexible, resilient fins which extend into contact with the back surface of the mirror thereby biasing it towards the retaining edge and preventing vibration. A layer of a resilient, impressionable material such as a plastisol of PVC may be applied to the back of the mirror element and into which the extending fins protrude or embed to further prevent undesired shifting or vibration of the mirror element. The plastisol layer also acts as a scatter-preventing means which retains the pieces of the mirror together should it be broken due to an accident or other impact.

Accordingly, the mirror assembly of the present invention is light in weight and reduces to a minimum the vibration or rattling of the mirror element within the case. Further, the mirror element is securely retained in the case in all temperature conditions due to the combination of the heat-formed, retaining edge and the expansion-absorbing means provided within the peripheral space about the mirror element.

These and other objects, advantages, purposes and features of the invention will become more apparent from a study of the following description taken in conjunction with the drawings.

DESCRIPTION OF THE PREFERRED EMBODIMENT

Figure 1:
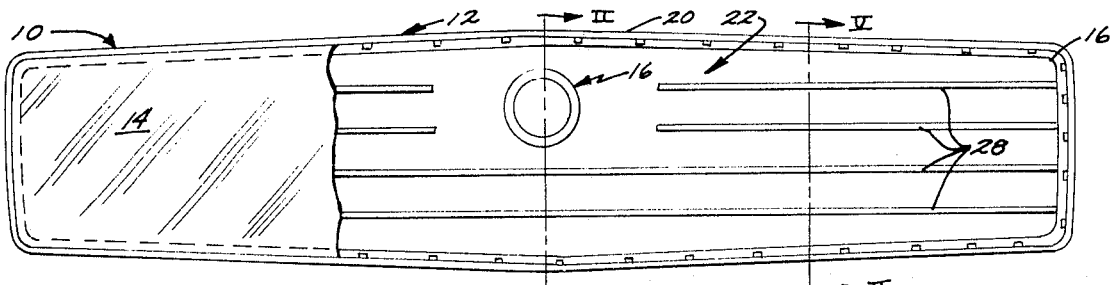
FIG. 1 is a front elevation of the mirror assembly of the present invention with a portion of the mirror element broken away.
Figure 2:
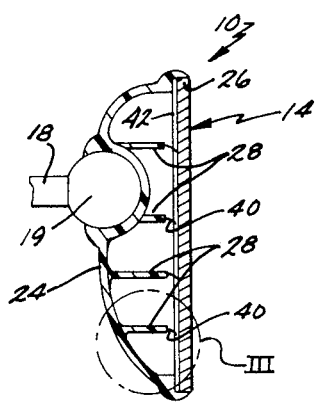
FIG. 2 is a sectional, side elevation of the mirror assembly taken along plane II—II of FIG. 1.

Referring now to the drawings in greater detail, FIG.

1 shows the mirror assembly 10 of the present invention including a mirror case 12, a mirror element 14, and a means for supporting the mirror assembly comprising a molded socket 16 receiving a mounting or supporting arm 18, including a swivel joint 19, from a suitable mounting area on the interior of a vehicle.

Mirror case 12 includes continuous, peripheral sides 20 extending about the entirely of the mirror element 14, a front opening 22 in which the mirror element 14 is received, and a back wall 24 spaced a predetermined distance from the back of the mirror element. The mirror element 14 is supported by the combination of a generally planar peripheral ledge 26 extending continuously about the periphery of the case and a plurality of upstanding support ribs 28 extending between the inside of the rear or back wall 24 of the case and the rear of the mirror element 14.

Figure 3:
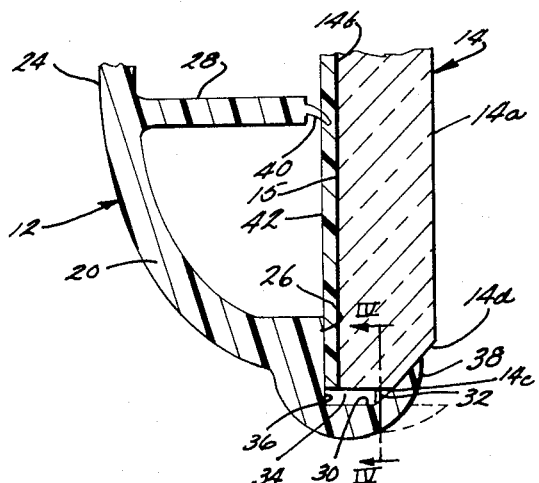
FIG. 3 is an enlarged, fragmentary, side elevation of the mirror-retaining and expansion-absorbing means showing area III of FIG. 2.

The mirror element 14 itself comprises a sheet of transparent material, preferably glass, having generally planar front and back surfaces 14a and 14b, respectively (see FIG. 3). These generally planar surfaces may be parallel to one another as shown in the drawings or may be formed at an angle with one another such that the mirror is a primsmatic mirror of the type generally used in day/night rearview mirror assemblies. The incorporation of prismatic mirrors in mirror assemblies is well known in the art. In the preferred embodiment of this invention, the rear surface 14b is coated with a layer 15 of reflective material such that the mirror is referred to as a second surface mirror. However, first surface mirrors, wherein the reflective layer is coated on the front surface 14a, may also be used. When received in case 12, mirror element 14 is seated such that rear surface 14b and reflective layer 15 are generally parallel to peripheral coplanar ledge 26 with support ribs 28 extending generally normally or perpendicular thereto.

The mirror case 12 is formed from a suitable thermoplastic material such that it may be formed easily and cured resulting in the finished product. Suitable materials include polyvinylchloride, polyethylene, and polypropylene. These materials are strong, resilient, memory retaining and remain flexible and resilient even in extremely hot and cold temperatures. Preferably, the case is injection molded in one piece after which it may be assembled with the mirror element 14.

Figure 4:
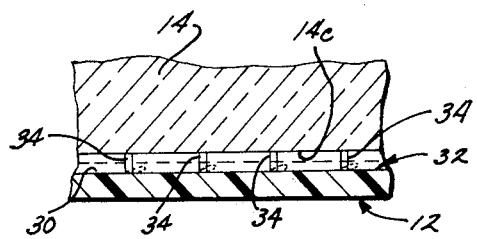
FIG. 4 is an enlarged, fragmentary, sectional, front elevation of a portion of the mirror assembly taken along plane IV—IV of FIG. 3.
Figure 5:
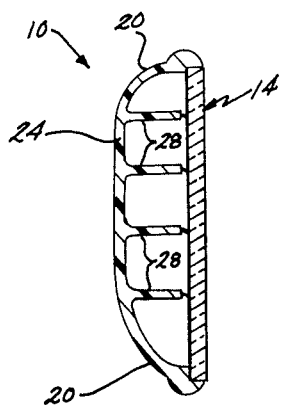
FIG. 5 is a sectional, side elevation of another section of the mirror assembly taken along plane V—V of FIG. 1.

In accordance with the concept of the invention, means are provided within the case 12 for prevention the rattling and vibration of the mirror element 14 therewithin as well as providing a secure retention of the mirror element within the case under even extreme temperature conditions. As shown in FIGS. 1, 3, 4 and 6, the peripheral sides 20 of the case 12 are provided with peripheral walls 30 extending continuously around the case generally parallel to the peripheral edge 14c of the mirror element. Walls 30 are spaced a distance from the edge 14c about its entire periphery thereby providing an integral, peripheral space 32 extending continuously about the mirror. Located at spaced intervals along the entire periphery and along wall 30 are a plurality of flexible, resilient expansion-absorbing fins 34 extending between wall 30 and into contact with peripheral edge 14c of the mirror. The base of each of the fins 34 adjacent the peripheral edge 26 may be made thinner than the remainder of the fin or separated from the ledge 26 such that the fins may flex easily along a line parallel to the wall 30. As seen in FIG. 4, the fins are fully extended in the ambient or normal temperatures generally encountered during normal use of a vehicle. Thus, the fins are uniformly in contact with the edge 14c about its entire periphery thereby firmly holding the mirror glass in place and preventing its rattling or vibration therein.

However, since the glass from which the mirror element 14 is preferably made generally has a lesser coefficient of linear expansion than does the thermoplastic material from which the case 12 is molded, exposure to extremely cold temperatures will cause the case 12 to contact at a greater rate than does the mirror element 14. Accordingly, space 32 between wall 30 and mirror edge 14c will be reduced in extremely cold temperatures as shown by the plantom line in FIG. 4. When this happens, fins 34 will bend or flex as shown in FIG. 4 to adjust to the lesser space and to firmly retain the mirror element such that it is prevented from rattling or vibrating even at such temperatures.

In order to accommodate extremely high temperatures, fins 34 may be made somewhat longer such that they are normally in a slightly flex position when the mirror assembly is at normal temperatures. Thus, in extremely high temperatures when the space 32 increases due to the differential in coefficient of expansion between the materials comprising case 12 and mirror element 14, the fins 34 extend to their full length to retain the mirror element firmly even with the greater space 32.

Facilitating the retention of the mirror element 14 within case 12, is a continuous, peripheral retaining lip or edge 38 forming the upper portion of the peripheral sides 20 of case 12. In the preferred embodiment, mirror element 14 includes a beveled edge 14d extending between front surface 14a and peripheral side edge 14c (see FIGS. 3 and 6). Retaining edge 38 cooperates with this beveled edge 14d and is heated and formed over against this edge during the assembly of the case and element. Accordingly, it will be understood that the peripheral side edge 38 is molded integrally and generally rectilinearly when the case 20 is made, as shown by the phantom lines in FIG. 3, and then is heated and formed over or "heat-staked" against the beveled edge 14d to retain the mirror element in the case. It will be noted that the heat staking is done only to the top or upper portion of peripheral edge 38 thereby providing the integral space 32 mentioned above.

Cooperating with the mirror-retaining edge 38 to hold the element securely within the case are the upstanding support ribs 28 including flexible, resilient extending fins 40. Fins 40, which may extend along the entire length of ribs 28 or be spaced at intervals therealong as desired, extend into contact with the rear surface 14b of mirror element 14. In their preferred state, fins 40 are flexed in order to bias the mirror element away from the back 24 of case 12 and toward the retaining edge 38. Accordingly, fins 40 normally extend or project beyond the plane including peripheral edge 26 and therefore are flexed or bent when the mirror 14 is assembled within the case as described above (see FIG. 3).

In the preferred embodiment shown in FIG. 3, the rear surface of mirror element 14 includes a layer 42 of flexible, resilient impressionable material such as a plastisol containing a vinyl resin into which the fins 40 project. The layer 42 serves the dual function of providing a backing layer which retains all portions of the mirror element 14 together should the mirror be broken or fractured in an accident or by some other impact. Further, the extension or protrusion of fins 40 into the layer 42 serves to further reduce the shifting or vibration of the mirror element within case 12. However, since the fins 40 preferably extend longitudinally of mirror 14, they do not hinder the longitudinal expansion and contraction of the mirror due to temperature changes as explained above. This is important because the longitudinal expansion and contraction will be much greater than the transverse or widthwise expansion and contraction for any given temperature change.

Figure 6:
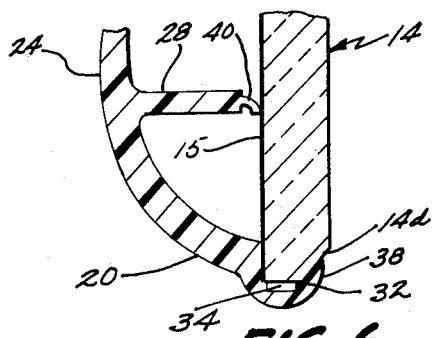
FIG. 6 is an enlarged, sectional, side elevation of a portion of an alternative embodiment of the mirror assembly similar to that shown in FIG. 3 but excluding the resilient, impressionable layer upon the back of the mirror element.

Alternatively, the mirror assembly may be assembled without providing a resilient, impressionable layer 42 on the back of the mirror element as shown in FIG. 6. In this embodiment, the resilient, flexible extending fins 40 contact directly the reflective coating 15 coated on the planar rear surface 14b of mirror element 14. Without layer 42, reflective layer 15 seats directly on ledge 26 resulting in fins 40 being flexed to the point where they are approximately coplanar with ledge 26 (see FIG. 6). A thin protective layer of paint or other material may be coated over the reflective layer 15 in this embodiment in order to prevent the wearing away of the reflective layer at points of contact by fins 40. In all other respects, this embodiment is similar to that shown in FIGS. 1–5 including the provision of an integral space 32 and expansion-absorbing fins 34 therein.

As will now be understood, the present invention provides a mirror assembly including a case formed from thermoplastic material which both prevents the vibration of the mirror element therein as well as securely retaining the mirror element therein under all temperature conditons. The case is extremely light in weight due to its shell-like construction but yet is extremely strong due to the stabilizing effect of support ribs 28 extending between the mirror element and the back of the case behind the mirror element. The assembly is very economical since the case may be formed or molded in one piece including support ribs 28 and fins 34 and 40. The mirror element 14 is then placed within the front opening 22 of the case such that it is held firmly between fins 34 and 40 and the retaining edge 38 is heated and formed over against the beveled surface 14d of the element. Thereafter, the mounting arm 18, including spherical swivel head 19, is snapped in place in the molded socket 16 provided therefor or otherwise secured to the case which is then ready for use in a vehicle.

While two forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A mirror assembly for vehicles comprising a mirror case having a back, a front opening, and peripheral sides, and a mirror element received in said case in said front opening, said mirror element including generally planar front and back surfaces, a peripheral edge and a reflective coating on one surface thereof; retaining means for holding said mirror element in said case; said case including means for supporting at least a portion of said back of said mirror element and holding said element against said retaining means and a wall outlining said peripheral edge of said mirror element; said wall being spaced outwardly from said mirror element edge along the entire length of said peripheral edge and including spaced, flexible fin means independent of said retaining and supporting means extending inwardly from said wall and generally normal thereto toward said peripheral edge from generally opposing portions of said wall for preventing movement of said mirror element in said case and for accommodating change in said spacing between said wall and mirror element peripheral edge due to temperature changes.

2. The mirror assembly of claim 1 wherein said spaced, flexible fin means comprise a plurality of flexible, resilient fins extending between said wall and said peripheral edge of said mirror element.

3. The mirror assembly of claim 2 wherein said case is molded from a thermoplastic material and said fins are molded integrally with said case wall from said thermoplastic material; said fins extending generally normally to said wall at spaced intervals therealong and contacting said mirror element peripheral edge.

4. The mirror assembly of claim 2 wherein said case back is spaced from said back surface of said mirror element and includes at least one rib extending between said case back and said back surface of said mirror element; said rib including resilient, flexible means for biasing said mirror element toward said retaining means.

5. The mirror assembly of claim 4 wherein said rib extends generally normally to said back surface of said mirror element; said flexible means comprising a flexible extension on a shoulder means included on the end of said rib, said extension having a thickness less than that of said rib and flexibly contacting said mirror element back surface.

6. The mirror assembly of claim 5 wherein said mirror element back surface includes a layer of resilient, impressionable material intermediate said flexible extension, said shoulder means and said mirror back.

7. The mirror assembly of claim 6 wherein said impressionable layer comprises a coating of resinous, thermoplastic material.

8. The mirror assembly of claim 1 wherein said case back is spaced from said back surface of said mirror element and includes at least one rib extending between said case back and said back surface of said mirror element; said rib including resilient, flexible means for biasing said mirror element toward said retaining means.

9. The mirror assembly of claim 8 wherein said rib extends generally normally to said back surface of said mirror element; said flexible means comprising a flexible extension on said rib having a thickness less than that of said rib and flexibly contacting said mirror element back surface.

10. The mirror assembly of claim 1 wherein said means for supporting said mirror element comprise a peripheral shoulder forming a portion of said peripheral sides; said shoulder lying substantially in one plane and supporting at least a portion of said mirror element about its periphery.

11. The mirror assembly of claim 1 wherein said mirror element includes a beveled surface between its front surface and peripheral edge; said means for supporting said mirror element comprising peripheral shoulder means; said retaining means comprising a portion of said peripheral side of said case formed into contact with said beveled surface and holding said mirror element against said shoulder means.

12. A mirror assembly for vehicles comprising a mirror case having a back, a front opening, and peripheral sides, and a mirror element received in said case in said front opening and including generally planar front and back surfaces, a peripheral edge, and a reflective coating on one surface thereof; said case including peripheral shoulder means supporting at least a portion of said back of said mirror along its periphery, a wall outlining said peripheral edge of said mirror element, and retaining means for holding said mirror element in said case; said back of said case being spaced from said back surface of said mirror element and including a plurality of spaced, resilient, flexible means extending against said back surface of said mirror element for biasing said mirror element toward and holding said mirror element against said retaining means.

13. The mirror assembly of claim 12 including spaced rib means for strengthening said case and supporting said back of said mirror element; said rib means including resilient, flexible means extending from the ends of said rib means into contact with said mirror element for biasing said mirror element against said retaining means.

14. The mirror assembly of claim 13 wherein said rib means comprise at least one rib extending generally normally to said back surface of said mirror element; said resilient, flexible means comprising a flexible extension on said rib having a thickness less than that of said rib and flexibly contacting said mirror element back surface.

15. A mirror case for vehicles comprising a back and peripheral sides defining a front opening adapted to receive a mirror element therein; said sides including means for retaining a mirror element in said case, shoulder means for supporting at least a portion of the periphery of a mirror element when received therein and a peripheral, upstanding wall means for outlining the periphery of a mirror element when received therein; said wall including spaced, flexible fin means independent of said shoulder means and retaining means for contacting the peripheral edge of a mirror element when received therein, for spacing the edge of such a mirror element from said wall and for accommodating changes in said spacing due to changes in temperature, said spaced, flexible means extending inwardly toward the interior of said case from portions of said wall generally opposing one another whereby a mirror element, when received in said case, is prevented from vibrating and rattling in said case regardless of the temperature of the atmosphere surrounding said case.

16. The mirror case of claim 15 wherein said wall completely outlines said opening and spaced, flexible fin means comprise a plurality of flexible, resilient fins spaced at intervals along and extending from the entirety of said wall.

17. The mirror case of claim 16 wherein said shoulder means comprise a ledge lying substantially in one plane and adjoining said peripheral wall, said case back spaced from said plane and including at least one rib extending toward said plane and having a resilient, flexible extension thereon extending through said plane.

18. The mirror case of claim 15 wherein said entire case, including said spaced fins and flexible extension, is molded integrally from a plastic material.

19. The mirror case of claim 15 wherein said shoulder means comprise a ledge lying substantially in one plane, said case back spaced from said plane and including at least one rib extending toward said plane and having a resilient, flexible extension thereon extending through said plane.

* * * * *